United States Patent [19]

Ungar et al.

[11] E Re. 31,373

[45] Reissued Sep. 6, 1983

[54] HIGH PRESSURE DECORATIVE LAMINATE HAVING REGISTERED COLOR AND EMBOSSING

[75] Inventors: Israel S. Ungar; Herbert I. Scher, both of Randallstown; Delbert A. Williams, Baltimore, all of Md.

[73] Assignee: Nevamar Corporation, Odenton, Md.

[21] Appl. No.: 967,213

[22] Filed: Dec. 7, 1978

Related U.S. Patent Documents

Reissue of:

[64] Patent No.: 4,092,199
Issued: May 30, 1978
Appl. No.: 528,776
Filed: Dec. 2, 1974

[51] Int. Cl.[3] ..... B32B 31/20

[52] U.S. Cl. ..... 156/222; 101/32; 156/219; 264/132; 264/137; 428/165; 428/171; 428/172

[58] Field of Search ..... 156/219–222; 428/151, 156, 161, 165, 172, 195, 207, 204; 264/284, 129, 319, 131, 132, 134, 135, 137; 427/25.6, 271, 276, 277; 101/32

[56] References Cited

U.S. PATENT DOCUMENTS 3,814,647 6/1974 Scher et al. ..... 156/209

FOREIGN PATENT DOCUMENTS 546143 2/1974 Switzerland .

*Primary Examiner*—Marion McCamish
*Attorney, Agent, or Firm*—Sheridan Neimark

[57] ABSTRACT

A decorative high pressure laminate having registered color and embossing is produced by effecting simultaneous embossing and laminating using a three dimensional press plate acting against an overlay sheet containing high flow melamine resin and pigment, so that during the pressing operation the resin and pigment flows laterally from the high pressure areas to the low pressure areas with the result that the underlying print sheet is visible through the overlay sheet in the high pressure areas while the pigment in the overlay sheet in the low pressure areas mask the print sheet.

8 Claims, 2 Drawing Figures

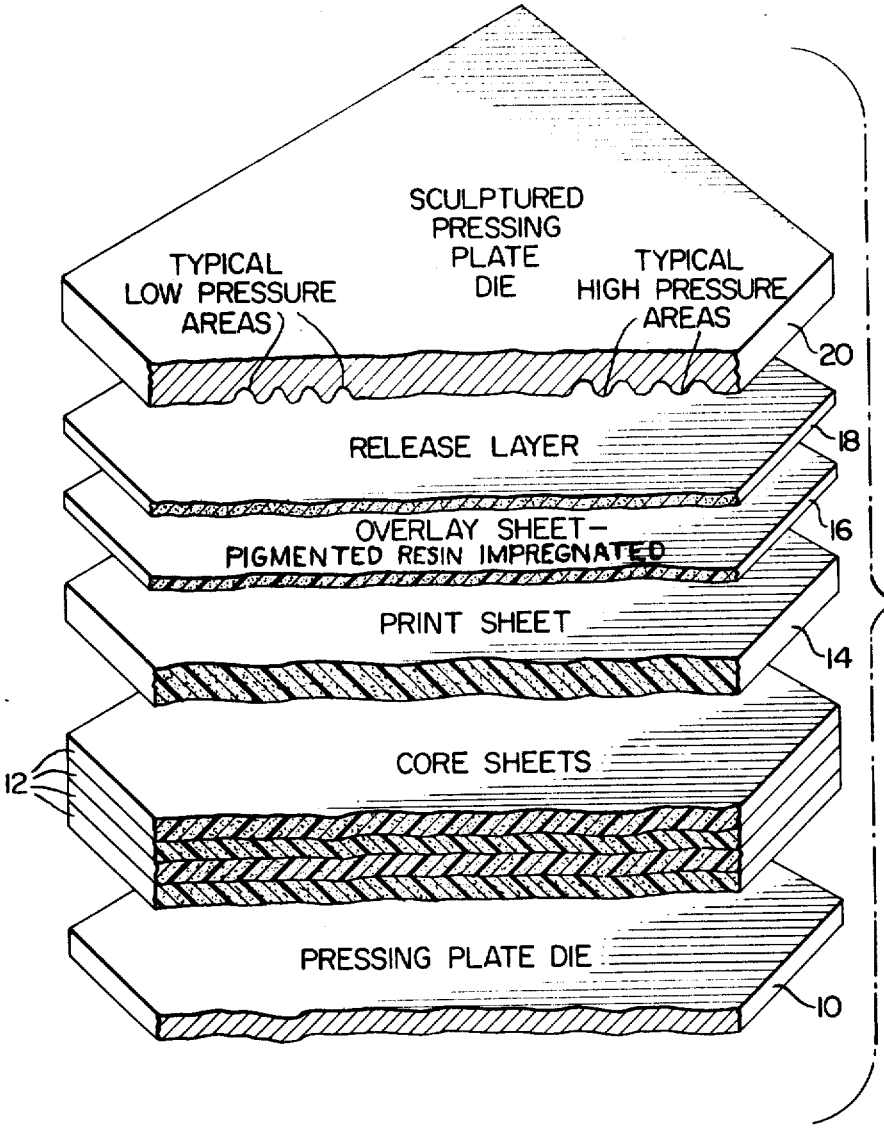
FIG. 1.
FIG. 2.
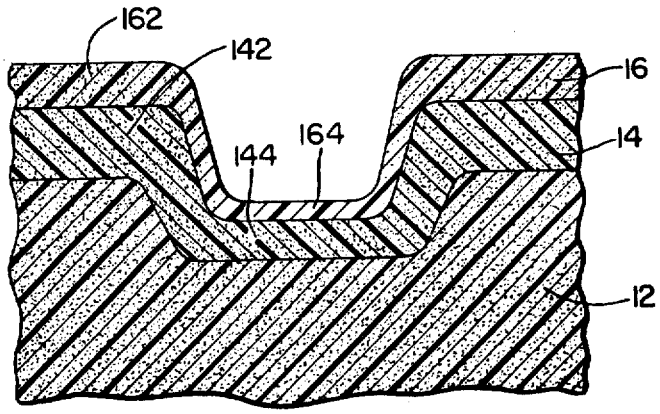

HIGH PRESSURE DECORATIVE LAMINATE HAVING REGISTERED COLOR AND EMBOSSING

Matter enclosed in heavy brackets [ ] appears in the original patent but forms no part of this reissue specification; matter printed in italics indicates the additions made by reissue.

Field of Invention

The present invention relates to high pressure decorative laminates and, more particularly, to such high pressure decorative laminates having aligned color and embossing which are in exact registry, and a process for preparing such laminates.

BACKGROUND

The production of high pressure laminates is well known, having been carried out for many years. Generally, the procedures for forming such laminates involve providing phenolic (i.e., phenol-formaldehyde) resin impregnated paper core sheets and melamine (i.e. melamine-formaldehyde) resin decorative and overlay sheets, and pressing the stacked resin impregnated sheets under heat on the order of 230°-310° F. and under pressure of approximately 800-1600 psi until the resins have become thermoset, thereby providing an extremely hard, attractive and permanent surfacing material known as a "high pressure laminate" meeting NEMA Standards. These high pressure laminates have, for many years, found use as counter and table tops, bathroom and kitchen work surfaces, furniture and cabinet surfacing, wall paneling and partitionings, doors, etc.

Most general purpose decorative high pressure laminates, of about 1/16 inch thickness, are formed of an assembly comprising a top ply of α-cellulose paper, about 20 lbs. ream weight, impregnated with a partially cured water solution of melamine-formaldehyde condensate; a print ply therebeneath, normally also an α-cellulose paper, pigment filled, with or without decorative printing on the surface thereof, ranging in weight from 50 to 125 lbs. ream weight and also impregnated with a partially cured amino resin condensate, usually the same melamine resin as used in the overlay ply; and therebeneath a plurality (e.g. six) core plys which are normally 100-130 lb. ream weight kraft paper, impregnated with a water or alcohol soluble partially cured phenolic resin condensate. All of such partially cured resin condensates are referred to as being in the "B-stage", in this stage they are thermoplastic and will flow under heat and pressure during the high heat, high pressure laminating procedure.

The above described assembly is repeated, back-to-back with a separator, each two laminates being separated by a pressing plate die, until a "book" containing, typically, 10 assemblies is obtained. The book is inserted in a high pressure press, and the laminates are cured under the conditions of heat and pressure indicated above. During the pressing cycle, the resins flow and cure, consolidating the individual plys and forming a comprehensive and infusible cross-linked product. After cure, the book is removed from the press and the laminates are separated, trimmed, and their backs or bottom surfaces sanded to improve adhesion for subsequently gluing to various substrates.

In the early years, generally only glossy surface laminates were produced (i.e. using polished molding surfaces), though some attempts were made to provide laminates with some slight surface irregularities to give satin or "textured" finishes. In more recent years it has become increasingly desirable to provide various types of irregular surfaces, ranging from relatively shallow depressions such as textured (e.g., satin, matte or semi-gloss) surfaces, to relatively deeply "sculptured" or embossed surfaces which have a noticeable three-dimensional effect, such as wood grain, leather, slate, abstract patterns, creative designs, etc. Particularly with the rising costs of natural products, it has become more desirable to provide deeply sculptured high pressure laminates which simulate natural materials such as wood, leather and slate.

Today, high pressure decorative laminates meeting NEMA Standards are manufactured with smooth glossy surfaces, with textured surfaces, or with deeply sculptured or embossed surfaces. In the latter case, a textured surface is usually superimposed on the embossed surface, and these textured surfaces are normally obtained by utilization of a release, parting or separating membrane or sheet of known type which is located, during the laminating operation, between the upper surface of the uppermost laminae and the molding plate die. In the production of deeply sculptured surfaces which simulate natural products such as slate, leather and wood, it is particularly desirable that the textured surfaces be superimposed over the face of the simulated product, since this provides a softer and more naturally appearing product.

In the manufacture of deeply embossed or sculptured surfaces having surface depth variations as great as 7 mils which duplicate natural products such as slate, leather, wood and the like, it has in the past generally been necessary to use either extremely expensive etched steel or stainless laminating die plates or, alternatively, thermoset pressing plate dies such as described in the Michaelson et al U.S. Pat. Nos. 3,303,081 and 3,311,520. While the use of such dies provides the necessary embossing, many simulated natural products, such as wood grain, must have appropriate color in registry with the surface embossing or debossing. Unfortunately, the problem of registration of color and embossing has proven very difficult, conventional registry techniques such as used in the printing industry being unreliable on a consistent basis in the manufacture of high pressure laminates, and also being extremely expensive, often involving complex electronic sensing equipment.

Other methods of providing laminates having registered color and texture having utilized valley printing, namely the inking of high portions of an engraved plate and pressing into the resin while curing. This operation, as well as the mechanical registration of an embossing roll or plate with a print, is difficult to carry into production and/or does not always give a uniform product. In addition, inks may not be compatible with or as durable as the base resin in which case the product will not meet NEMA Standards.

In more recent years, a number of other techniques have been developed in an attempt to solve the problems of registration of color and embossing in the manufacture of deeply sculptured high pressure laminates. Certain of these techniques have been found to be highly useful in the preparation of certain specific types of configuration, e.g. see U.S. Pat. Nos. 3,700,537 and 3,698,978. Other recent techniques have been more versitile from the viewpoint of the design of the product (note, e.g., U.S. Pat. Nos. 3,814,647; 3,732,137; 3,802,947 and 3,661,672), but some of these recent techniques have been less than fully desirable because they require special materials and/or are difficult to carry out successfully with the result that the products are depressions such as textured (e.g., satin, matte or semi-gloss) surfaces, to relatively deeply "sculptured" or embossed surfaces which have a noticeable three-dimensional effect, such as wood grain, leather, slate, abstract patterns, creative designs, etc. Particularly with the rising costs of natural products, it has become more desirable to provide deeply sculptured high pressure laminates which simulate natural materials such as wood, leather and slate.

Today, high pressure decorative laminates meeting NEMA Standards are manufactured with smooth glossy surfaces, with textured surfaces, or with deeply sculptured or embossed surfaces. In the latter case, a textured surface is usually superimposed on the embossed surface, and these textured surfaces are normally obtained by utilization of a release, parting or separating membrane or sheet of known type which is located, during the laminating operation, between the upper surface of the uppermost laminae and the molding plate die. In the production of deeply sculptured surfaces which simulate natural products such as slate, leather and wood, it is particularly desirable that the textured surfaces be superimposed over the face of the simulated product, since this provides a softer and more naturally appearing product.

In the manufacture of deeply embossed or sculptured surfaces having surface depth variations as great as 7 mils which duplicate natural products such as slate, leather, wood and the like, it has in the past generally been necessary to use either extremely expensive etched steel or stainless laminating die plates or, alternatively, thermoset pressing plate dies such as described in the Michaelson et al U.S. Pat. Nos. 3,303,081 and 3,311,520. While the use of such dies provides the necessary embossing, many simulated natural products, such as wood grain, must have appropriate color in registry with the surface embossing or debossing. Unfortunately, the problem of registration of color and embossing has proven very difficult, conventional registry techniques such as used in the printing industry being unreliable on a consistent basis in the manufacture of high pressure laminates, and also being extremely expensive, often involving complex electronic sensing equipment.

Other methods of providing laminates having registered color and texture having utilized valley printing, namely the inking of high portions of an engraved plate and pressing into the resin while curing. This operation, as well as the mechanical registration of an embossing roll or plate with a print, is difficult to carry into production and/or does not always give a uniform product. In addition, inks may not be compatible with or as durable as the base resin in which case the product will not meet NEMA Standards.

In more recent years, a number of other techniques have been developed in an attempt to solve the problems of registration of color and embossing in the manufacture of deeply sculptured high pressure laminates. Certain of these techniques have been found to be highly useful in the preparation of certain specific types of configuration, e.g. see U.S. Pat. Nos. 3,700,537 and 3,698,978. Other recent techniques have been more versitile from the viewpoint of the design of the product (note, e.g., U.S. Pat. Nos. 3,814,647; 3,732,137; 3,802,947 and 3,661,672), but some of these recent techniques have been less than fully desirable because they require special materials and/or are difficult to carry out successfully with the result that the products are provided the conventional bottom pressing plate 10 having a flat, but unfinished surface; the conventional plurality of phenolic resin impregnated paper core sheets 12, a conventional amino resin impregnated colored print sheet 14, the overlay sheet 16, a conventional parting or release layer 18, and the sculptured or embossed pressing plate die 20.

The overlay sheet 16 differs from the conventional melamine resin impregnated α-cellulose paper impregnated overlay sheet normally used in a high pressure laminate lay-up or assembly in that it is impregnated with an opacifying pigment contained in a conventional melamine resin. The combination of melamine resin and pigment is such that during the pressing operation most of the resin and the pigment will migrate laterally through the overlay sheet from the high pressure areas to the low pressure areas *causing a separation of colors* so that in the final laminate the debossed areas will be relatively free of pigment in the overlay sheet so that the print sheet therebeneath will be visible, while in the embossed areas the pigment will be relatively concentrated so as to mask the print sheet therebeneath.

The lightweight overlay sheet 16 is prepared in the normal manner except that a finely divided opacifying pigment is utilized with the melamine resin. Thus, the lightweight α-cellulose paper is impregnated with the melamine resin containing the selected pigment; however, the pigment does not become embedded in the individual cellulose fibers to any significant degree and does not become bound to the cellulose of the paper, but it does lie between the cellulose fibers. The amount of pigment in the melamine resin is a function of the color and hiding power of the pigment selected, although typically they will be used in an amount of 0.5 to 10% by weight of pigment based on the resin impregnating solution.

Preferably the pigments are predispersed in water, since this eliminates milling or grinding in conjunction with the resin, which has a tendency to advance the resin cure in an undesirable manner. After predispersing the pigments in water, the dispersion is mixed with the normal type of melamine resin solution, e.g. a 10–90 mixture of isopropyl alcohol and water to which normal adjuvants are added. The normal impregnating procedures are used by passing the α-cellulose paper through the resin solution containing the dispersed pigment in order to saturate the paper, and then wiping excess liquid from the surface of the paper, and finally drying in an oven at 250°–350° F.

In order to obtain the objectives of lateral flow of resin and pigment during the pressing operation, it is normally preferred that the resin content in the dried overlay sheet be 65–70%, that the volatile content be 6–10%, and that the flow* be 7–35%. Higher flow results in undesirably greater transparency in the debossed portions of the laminate so that there is undesirably high show-through of the underlying print sheet; if sufficient flow is not provided, results will be undesirable in that sufficient contrast will not be provided. Accordingly, it is preferred that flows of 7–15% be provided, since these produce the most satisfactory results.

*flow is measured by weighing 12 impregnated paper disks of 1⅛ inches diameter, laminating them at 305° F. and 1000 psi, removing the flash from the circumference, and calculating the weight loss as follows:

FLOW = Weight loss × 100/Original Weight

It has been determined that the degree of flow is critical, although the degree of flow to obtain success is also dependent on the depth of the debossing elements of the pressing plate die so that with greater depth of the debossing portions of the die, the degree of flow may be less, while with shallower debossing portions of the die, the degree of flow must be greater. If flow is too low, the print sheet color will not show through; if the flow is too high, most of the color flows away and the color becomes diffused.

Increasing the resin and/or volatile content will increase the flow. If the volatile contents are too high causing increased flow, the surface may "milk out" causing too low a resin content in the debossing portions and thereby giving an unsatisfactory product in which the debossed portions are dry and insufficiently hard and resistant. The flow is regulated by a combination of resin content, volatile content and by the temperature at which the paper is dried. Those having normal skill in the art will be able to provide a flow within the range of 7–35% based on current knowledge.

With regard to the nature of the sculptured pressing plate die 20, any such plate may be used. For example, one may use an expensive machined or etched steel or stainless steel plate, or one may use a molding plate of the type described in the Jenkins Pat. No. 2,606,855, or the Michaelson et al U.S. Pat. Nos. 3,303,081 or 3,311,520. Also, one may use a thin, embossed, impregnated separator sheet having a nonstick facing of the type disclosed in the Scher et al U.S. Pat. No. 3,674,619, as the embossing surface, in which case the release layer 18 may be eliminated along with the sculptured printing plate die 20, though a flat pressing plate of the nature of pressing plate die 10 will be used to back up the thin, embossed, impregnated separator sheet. One may also use a texturizing film of the type disclosed in the Ungar et al U.S. Pat. No. 3,761,338.

In those instances where a release or parting layer 18 is used, such layers may be selected from those commercially available. These release layers 18 usually provide the dual function of imparting a textured finish to the laminate and also preventing adhesion of the upper surface of the laminate, i.e., the overlay layer 16, to the sculptured pressing plate die 20. Among the release sheets 18 commercially available may be mentioned aluminum foil, silicone resin or silicone oil treated paper, "Quillon" treated paper, fluorocarbon resin treated paper, sodium alginate treated paper, paper-aluminum foil laminate, parchment or glassine papers, etc. Any of these materials may be used as the release layer 18, so long as the non-adherent surface of the release layer 18 is facing the overlay 16.

The print layer 14 may be of the conventional type, either of one color or a plurality of colors. The color may be applied to the upper surface, or it may be internally applied. As indicated above, the print sheet will normally comprise α-cellulose paper impregnated with melamine resin and dye or pigment. The color of the print sheet is chosen for its desired contrast to the pigment used on the overlay sheet.

The plurality of core sheets 12 will normally comprise kraft paper impregnated with phenolic resin in accordance with usual practice. The pressing plate die 10, located immediately below the core sheets 12, may comprise a simple metallic plate, such as is conventionally used.

The lay-up or assembly or composite is cured using a normal pressing cycle at 800–1200 psi and 260°–310° F. for 45–90 minutes, the press time given assuming starting with a cold press and ending cold.

During pressing, the melamine resin melts, flows and then cures to a hard, infusible state. When the press is opened a pleasing texture is present with pigment concentrated in the embossed areas and the print sheet showing through at the debossed areas. It is clear that the pigment and most of the resin move laterally from the high pressure areas to the low pressure areas and, in the product, varying amounts of the print sheet color show through, depending on the thickness of the overlay layer, which in turn depends on the varying pressure from point-to-point, which in turns depends on the design in the embossed press plate.

Referring to FIG. 2 there is shown a small portion of a cross-section of a laminate produced in accordance with the present invention. Simulated natural products, such as leather and wood, having mottled irregular type patterns, are particularly suited to be formed by the present technique. From FIG. 2 it is seen that in the debossed portion the overlay 16 is relatively thin at 164 and the print layer 14 can be seen at portion 144 through the relatively transparent portion 164 of the overlay sheet 16. To the contrary, at the embossed portions the overlay sheet 16 is relatively thick at portions 162 and the pigment, having migrated from portion 164, is relatively dense and so the print layer 14 at portion 142 is not visible through opaque portion 162 of the overlay sheet 16. Between the two extremes there is a gradual transition.

The product is provided with embossed areas and debossed areas by pressing against the sculptured pressing plate die 20. The resulting laminate has the color of the pigment in the overlay sheet 16 at the embossed portions 162, and at the debossed portions has the color of the print sheet 14 as seen through the transparent portion 164 of the overlay sheet 16. In general, it will be understood that any combinations of print paper color and pigment color in the overlay 16 are possible with the result being a high pressure laminate having areas with contrasting color and surface configuration in exact registration.

The above process is not limited to high pressure laminates, but is equally applicable to the so-called low pressure board where surface sheets are applied directly to particle board.

The following examples, offered for purposes of further illustration without limitation, will more fully reveal the nature of the invention.

COMPARATIVE EXAMPLE I

Clear α-cellulose overlay paper was impregnated with conventional unpigmented melamine-formaldehyde resins to provide 69.7% resin content, 6.7% volatile content and 19.4% flow. Three sets of 12 samples, 1⅛ inch in diameter, were cut from the treated paper and pressed at 300° F. and 1000 psi for 5 minutes. The resulting cured discs had clear melamine resin pressed out at the edges thereof.

COMPARATIVE EXAMPLE II

Commercially pigmented α-cellulose overlay paper was impregnated with regular, unpigmented resin to 69.7% resin content, 6.7% volatile content and 19.4% flow. Three sets of 12 samples were cut and tested as specified in Comparative Example I. The resin squeezed out from the edges during lamination was only slightly tinted, showing that flow of the pigment from the commercially pigmented overlay was insignificant.

COMPARATIVE EXAMPLE III

Unpigmented overlay paper was impregnated with pigmented melamine resin in accordance with Formulation #1 below, to provide 66.2% resin content, 5.2% volatile content and 20.5% flow. Three sets of 12 samples were cut and tested as specified in Comparative Example I. The resultant discs were still dark brown as was the melamine resin squeezed out at the edges of the discs, showing that during lamination, the pigment is carried along by the resin flow. Nevertheless, the samples were unsuitable for purposes of the present invention because there was no contrast from the use of an underlying print sheet and the use of a properly textured die.

Formulation #1

Melamine resin impregnating solution—100 parts by wt.

295 Brown pigment—3.5 parts by wt.

X60 Black pigment—0.7 parts by wt.

The above mentioned conventional melamine resin impregnated solution is formed by mixing 1068 parts by weight of water with 1905 parts by weight of 50% formaldehyde solution and 2320 parts by weight of melamine. The pH is adjusted to 9.2–9.4 with sodium hydroxide. The solution is cooked to a water tolerance of 1:1 and 212 parts by weight of methanol are added to obtain such conventional melamine resin impregnating solution.

COMPARATIVE EXAMPLE IV

An unpigmented overlay sheet of the type specified in Comparative Example I was impregnated with a clear, unpigmented melamine resin. An assembly was formed using such impregnated overlay immediately above a pale yellow, impregnated print sheet. Beneath the print sheet was provided 6 core layers in accordance with conventional practice, and the assembly, using a metal foil separator and a leather textured negative plate above the overlay sheet, was pressed at 1000 psi under heat for 14 minutes to provide 6 minutes at 295° F., and was then cooled for 5 minutes. The resultant laminate surface reproduced the leather grain texture of the leather textured laminating die plate, but the color across the entire surface was a solid pale yellow which did not give the visual appearance of leather.

COMPARATIVE EXAMPLE V

An overlay sheet of the type specified in Comparative Example III was pressed, using the same pale yellow print sheet under the overlay sheet and the same conditions as used in Comparative Example IV. The only changes in make-up were the replacement of the clear overlay sheet with the pigmented resin treated overlay sheet and the replacement of the leather textured negative laminating die plate with a flat steel plate. Pressing conditions were identical.

The resultant laminate was a dark brown with a yellow undertone and no variation in color occurred except an over-all slight mottled appearance due to paper fiber formation. This shows that in the absence of surface variations in the pressing plate, there will be inadequate flow of pigmented resin to areas of low pressure and there is no effective color change due to the use of the flat plate.

Example 1

Unpigmented overlay sheet treated with pigmented resin as specified in Comparative Example III was pressed, using the same pale yellow print sheet as used in Comparative Example IV under the overlay. The only change in make-up was the replacement of the clear overlay in Comparative Example IV with the pigmented resin treated overlay sheet. The only difference between this Example and Comparative Example V was the use of the leather grain negative surface textured laminating die plate, not used in Comparative Example V. Pressing conditions were the same as in Comparative Examples IV and V.

The resultant laminate had dark brown color in the highest areas of the resultant leather surface texture in the laminate, and in the lowest areas, i.e. the debossed portions, the color was a light yellow tan. At the levels of texture between the highest and lowest, the color ranged in intensity between the two levels noted. The appearance of the laminate was dramatic in that it looked exactly like grain leather.

COMPARATIVE EXAMPLE VI

A clear overlay sheet was treated with the pigmented resin Formulation #1 indicated in Comparative Example 3 above, to provide a resin content of 68.2%, a volatile content of 5.2%, but with a flow reduced to 6%. A laminate assembly was prepared as set forth in Comparative Example IV and the assembly was laminated under the conditions set forth in Comparative Example IV.

The resultant laminate had very little contrast between the high and low pressure areas. The laminate was a dark brown on the peaks with a slight decrease in color intensity in the valleys. This comparative example establishes the approximate lower limit of flow which will produce the desirable effect of the present invention.

Example 2

Comparative Example VI was repeated except that the clear overlay sheet was so treated with the pigmented resin of Formulation #1 that the flow was increased to 7%. Otherwise the make-up and pressing conditions were identical. The resultant laminate had good contrast between the embossed peaks which were dark brown and the debossed valleys which were tan; while the contrast was adequate, the results were not as satisfactory as those of Example 1.

COMPARATIVE EXAMPLE VII

An unpigmented overlay sheet was treated with the pigmented resin Formulation #1 to provide a resin content of 67.4%, a volatile content of 10.2% and a flow of 41%. The make-up and pressing conditions were the same as in Comparative Example IV. While the color difference from embossed peak to debossed valley was easily discernible in the resultant laminates, such laminate had an over-all loss of color intensity and the results were not satisfactory. This comparative example establishes the approximate upper limit of flow.

Example 3

Comparative Example VII was repeated except that the unpigmented overlay treated with the pigmented resin Formulation #1 was provided with a flow of 35% instead of 41%. The make-up and pressing conditions were again the same as in Comparative Example IV. The resultant laminate had adequate color intensity and the color differences from peak to valley were again easily discernible.

COMPARATIVE EXAMPLE VIIIA

Unpigmented α-cellulose overlay paper was treated with the pigmented resin Formulation #2 given below to provide a resin content of 66.2%, a volatile content of 7.0% and a flow of 18%. The resultant laminate showed little color change due to the hiding power of the heavy pigment concentrations.

Formulation #2

Melamine resin impregnating solution of Formulation #1—100 parts
X60 Black pigment—1 part
295 Brown pigment—5 parts

COMPARATIVE EXAMPLE VIIIB

Comparative Example VIIIA was repeated using Formulation #3 in place of Formulation #2. The same resin content, volatile content and flow were provided, and the make-up and pressing conditions were the same as in Comparative Example IV. Once again, the resultant laminate showed little color change due to the hiding power of the heavy pigment concentrations.

Formulation #3

Melamine resin impregnating solution of Formulation #1—100 parts
295 Brown pigment—5 parts
X60 Black pigment—0.5 parts
142 Yellow pigment—3 parts

COMPARATIVE EXAMPLE IX

Unpigmented α-cellulose overlay paper was treated with resin Formulation #4 given below to provide a resin content 67%, a volatile content of 7% and a flow of 16.4%. Once again, the make-up and pressing conditions used were those of Comparative Example IV. However, the resultant laminate showed little color change due to the low level of pigment concentration.

Formulation #4

Melamine resin impregnating solution of Formulation #1—100 parts
142 Yellow pigment—1 part

COMPARATIVE EXAMPLE X

Unpigmented overlay sheet was treated with resin Formulation #5, below, to provide a resin content of 64%, a volatile content of 6–7% and flow of 16%. Pressing and make-up were the same as in Comparative Example IV. The resultant laminates were tested for color fastness in accordance with NEMA Standards and color change was moderate showing that the dyes of Formulation #5 were not color fast. Thus, the laminate did not meet NEMA Standards and could not properly be considered a "high pressure laminate".

Formulation #5

Melamine resin impregnating solution of Formulation #1—1600 parts
295 Brown pigment—60 parts
X60 Black pigment—3 parts
Yellow Metonil Dye—18 parts
Yellow DR Dye—3 parts Example 4

Example 1 was repeated to produce several laminates. These laminates, pressed as specified in Example 1 using the make-up and pressing parameters of Comparative Example IV, were tested for light fastness in accordance with NEMA Standards. No color change was noted and the results were generally excellent.

Example 5

Unpigmented overlay sheet was treated as set forth in Comparative Example III and was pressed using the conditions and make-up of Comparative Example IV, except that a cane textured laminating plate was used in place of the leather grain laminating plate. Results were excellent with the peaks of the resultant laminate being dark and the low areas showing the color of the underlying print layer.

Example 6

Example 5 was repeated except that in place of the cane textured laminating plate there was used a hammered metal textured laminating the plate. Once again, the resultant laminate was excellent in quality with good contrast between the embossed peaks and the debossed valleys.

Example 7

Once again, the procedure of Example 5 was repeated, this time using a wood grain textured laminating plate instead of a leather grain laminating plate and using a black print sheet. Once again, results were excellent with the high parts of the laminate being dark brown and the low areas, i.e. depressed portions of the artificial wood, showing the black color of the pigmented print layer therebeneath.

Example 8

Example 5 was again repeated, this time using a fancy engraved pressing plate die designed to simulate a Spanish tooled leather design. The resultant laminate had excellent properties and had the appearance of tooled Spanish leather.

It will be obvious to those skilled in the art that various changes may be made without departing from the scope of the invention and the invention is not to be considered limited to what is shown in the drawings and described in the specification. It will be understood that selection of the proper amount of pigment is somewhat empirical and depends on the design desired in the ultimate product and the various pigments selected; accordingly, one having normal skill in the art will conduct some trial and error runs after he has selected his pigment in order to determine the optimum quantity. In general it can be said that one should use an amount of pigment sufficient to provide opacity in the embossed peaks without opacifying the debossed valleys.

What is claimed is:

1. A method of forming a unitary decorative laminate having registered color and embossing comprising:

A. assembling in a stack from the bottom up (1) backing means for said decorative laminate, (2) a thermosetting resin impregnated fibrous print sheet provided with a first color, (3) a fibrous overlay sheet substantially uniformly impregnated with an opacifying mixture of a thermosetting resin impregnating solution having dispersed therein finely divided pigment of a color contrasting with said first color, said pigment being retained substantially on the fibers of said overlay sheet and *not being bound to the cellulose of the paper, and*

(4) a sculptured pressing plate die having a surface with high areas and low areas capable of being impressed into the uppermost of said fibrous sheets with said high and low areas adjacent said overlay sheet, and means to prevent said sculptured pressing plate die from sticking to said overlay sheet during lamination;

B. applying to the upper and lower surfaces of said assembly sufficient heat and pressure to cure said resins to produce said unitary embossed decorative high pressure laminate by (1) effecting a lamination of said fibrous sheets together with each other and with said backing means, (2) imparting the sculptured surface of said die to the uppermost of fibrous sheets and (3) effecting lateral flow of said opacifying mixture of said thermosetting resin and said pigment on said overlay sheet from the debossed portions of the surface of said laminate to the embossed portions of said laminate *causing a separation of colors* so that said first color is visible in said debossed portions and said contrasting color of said finely devided pigment is visible in said embossed portions; and C. stripping said sculptured die from the resultant laminated assembly so as to provide said laminate having areas of registered color and embossing.

2. A method in accordance with claim 1 for forming a high pressure decorative laminate, wherein said backing means comprise phenolic resin impregnated core sheets, wherein said print sheet comprises a melamine resin impregnated $\alpha$-cellulose paper, and said overlay sheet comprises melamine resin impregnated $\alpha$-cellulose paper.

3. A method in accordance with claim 2 wherein said means to prevent said sculptured pressing plate die from sticking to said overlay sheet comprises a separate release sheet.

4. A method in accordance with claim 2 wherein said pressing plate die comprises a thin, embossed, impregnated separator sheet having a non-stick facing.

5. A method in accordance with claim 2 wherein in step B said assembly is pressed at approximately 800–1600 psi at a temperature on the order of 230°–310° F.

6. A method in accordance with claim 2 wherein said $\alpha$-cellulose overlay sheet has a melamine resin content in the 65–70% range, a volatile content of 6–10% and a flow of 7–35%.

7. A method in accordance with claim 6 for forming a high pressure decorative laminate simulating leather, wherein said first color is pale yellow and wherein said finely divided pigment comprises opacifying pigments providing a dark brown color and present in a quantity of 1–5% based on the weight of the melamine resin impregnating solution.

*8. A method in accordance with claim 1 wherein said first color is darker than the color of said pigment.*

* * * * *